(12) United States Patent
Gregorius

(10) Patent No.: US 7,292,631 B2
(45) Date of Patent: Nov. 6, 2007

(54) FEED FORWARD EQUALIZER AND A METHOD FOR ANALOG EQUALIZATION OF A DATA SIGNAL

(75) Inventor: Peter Gregorius, Munich (DE)

(73) Assignee: Infineon Technologies AG, Munich (DE)

( * ) Notice: Subject to any disclaimer, the term of this patent is extended or adjusted under 35 U.S.C. 154(b) by 707 days.

(21) Appl. No.: 10/808,167

(22) Filed: Mar. 24, 2004

(65) Prior Publication Data

US 2004/0247025 A1   Dec. 9, 2004

Related U.S. Application Data

(60) Provisional application No. 60/457,811, filed on Mar. 26, 2003.

(51) Int. Cl.
*H03K 5/159* (2006.01)
(52) U.S. Cl. .................. 375/232; 375/229; 375/350
(58) Field of Classification Search ............. 375/132, 375/233, 229, 234, 350; 333/18; 708/300–323
See application file for complete search history.

(56) References Cited

U.S. PATENT DOCUMENTS 5,646,958 A * 7/1997 Tsujimoto ............. 375/233
5,930,296 A * 7/1999 Kot ....................... 375/233
2005/0135473 A1* 6/2005 Asuri et al. ........... 375/234

* cited by examiner

*Primary Examiner*—Chieh M. Fan
*Assistant Examiner*—Julia P Tu
(74) *Attorney, Agent, or Firm*—Jenkins, Wilson, Taylor & Hunt, P.A.

(57) ABSTRACT

A feed forward equalizer for analog equalization of a data signal received over a data transmission channel comprising a Master Delay Locked Loop (MDLL) for generating equidistant reference phase signals; a Slave Delay Line (SDL) formed by serial connected Slave Delay Units (SDU), wherein each Slave Delay Unit (SDU) has a Slave Delay Element (SDE) to delay the received data signal with a predetermined delay time ($\Delta T$) and an analog amplifier which amplifies the delayed output signal of the Slave Delay Element (SDE) with a respective weighting coefficient to generate a weighted delay signal, wherein the analog amplifier is switched transparent in response to a corresponding reference phase signal generated by said Master Delay Locked Loop (M-DLL); and subtracting means for subtracting the weighted delay signals which are selected by means of a multiplexer from the received data signal to generate an equalized output data signal.

19 Claims, 10 Drawing Sheets first embodiment

FEED FORWARD EQUALIZER AND A METHOD FOR ANALOG EQUALIZATION OF A DATA SIGNAL

RELATED APPLICATIONS

This application claims the benefit of U.S. Provisional Patent Application Ser. No. 60/457,811, filed Mar. 26, 2003, the disclosure of which is incorporated herein by reference in its entirety.

TECHNICAL FIELD

The invention refers to equalization of data pulses which are severely distorted by a transmission line/channel.

BACKGROUND ART

In bandwidth efficient digital communication systems the effect of each symbol transmitted over a time dispersive channel extends beyond the time interval used to represent that symbol. The distortion caused by the resulting overlap of received symbols is called intersymbol interference (ISI). Intersymbol interference (ISI) arises in all pulse modulation systems, including frequency shift keying (FSK), phase shift keying (PSK) and quadrature amplitude modulation (QAM) and pulse amplitude modulation (PAM).

Band limiting of the transmission channel results in the data signal at the receiver being subject to distortion caused by intersymbol interference (ISI).

When transmitting data pulses via a data transmission channel severe signal distortion caused by band limiting of the transmission channel, signal reflections (echo) are caused by incorrect matching to the line impedance both at the transmitting end and at the receiving end of the data transmission channel and resonances in the transmission characteristic of the data transmission channel degrade the received signal.

The purpose of an equalizer placed in the path of the received signal is to reduce the intersymbol interference (ISI) as much as possible to maximize the probability of correct decisions. Accordingly an equalizer is a filter to reduce the effect of intersymbol interference.

There are many different type of equalizers. The simplest form of an equalizer is a linear transversal equalizer wherein the current and passed values of the received data signal are linearly weighted by equalizer coefficients which are summed up to produce an equalizer output signal.

Non linear decision feedback equalizers (DFE) are particularly useful for data transmission channels which severe amplitude distortion. A decision feedback equalizers (DFE) uses decision feedback to cancel the interference from symbols which have been already detected. The decision feedback equalizer comprises a forward circuit part and a feedback circuit part and the equalized signal is formed by the sum of the outputs of the forward and feedback parts. The forward circuit part of the decision feedback equalizer is formed like a linear transversal equalizer as discussed above. Decisions made on the equalized signal are fed back via a second transversal filter. The basic idea of decision feedback equalizers is that if the values of the symbols are already detected are known (past decisions assumed to be correct) then the intersymbol interference contributed by these symbols can be canceled exactly, by subtracting path symbol values with appropriate weighting from the equalizer output.

In contrast to lower-frequency applications for data transmission (for example 2 Mbit/s band), complex equalization of the data stream upstream of a data recovery unit (for example clock and data recovery, CDR) is not possible. Conventional methods which are based on over-sampling by means of analog/digital converters and digital equalization (for example Viterbi decoders, Decision Feedback Eq. Etc.) can generally not be used for very high data rates, for technological reasons (maximum bandwidth of semiconductor technology).

At present, the preamplifiers for data transmission applications via PBC or back-plane connections are generally simple limiting amplifiers. They are provided to maximize the eye opening, that is to say the amplitude of the signal, in order that the downstream data recovery unit has as much signal energy as possible with the best possible signal-to-noise ratio (SNR) for evaluation at the decision time.

Increasing the SNR by signal limiting is valid only for as long as the input signal to be amplified is not subject to major edge an/or amplitude noise. However, in reality, the signal is generally noisy. The consequence of simple limiting is AM-to-PM conversion, that is to say conversion of the amplitude error to increased edge noise. Error-free recovery of the signal thus becomes considerably more difficult for the downstream data recovery unit, in this case generally a clock and data recovery circuit or timing recovery circuit. A worse bit error rate can generally be expected. The maximum possible range and the maximum permissible attenuation of the channel are in consequence restricted. This is contrary to the requirement for high data rates of more than 1 Gbit/sec over relatively highly band-limited transmission paths.

A proposed prior art solution is to use complex adaptation methods. There are two major options for this—a linear feed forward equalizer (FFE) or an equalizer with feedback (DFE), such as decision feedback.

Other conventional equalizers, which are based on statistical methods, can be used only to a limited extent at these high data rates owing to the lack of additional information in the data stream, for example a preamble. This is a purely stochastic data stream.

The implementation of the sated prior art adaptation methods—for example decision feedback (DFE) is considerable complex.

FIG. 1 shows a feed forward equalizer (FFE) according to the state of the art.

The transmitter sends a data signal via a data transmission channel to the input of the feed forward equalizer as shown in FIG. 1. The feed forward equalizer (FFE) is provided to suppress intersymbol interferences (ISI) caused by the data transmission channel. For this purpose the feed forward equalizer (FFE) comprises a low path filter (LPF) which is connected in series to a first amplifier A1 the output of which is connected to substracting means to substract the filtered and amplified signal from the received signal buffered by a second amplifying means A2. The equalized output signal of the feed forward equalizer (FFE) is output to a decision unit of a receiver. The low path filter (LPF) employed by the feed forward equalizer (FFE) according to the state of the art as shown in FIG. 1 can be an analog or passive low path filter.

The analog equalization method according to the present invention combines discrete time methods with continuous-time methods for equalization of the data signal, in particular for high-speed serial data transmission, in which quantization of the signal is impossible or is too complex. The method according to the invention offers a capability for simple signal equalization without feedback. In most (multichannel) high-speed links, the necessary phases for the equalizer are required in any case for the subsequent timing recovery. Only a small amount of additional circuit complexity is thus required. Furthermore, this unit can be designed such that it can be adjusted as required—until the circuit function is reduced to that of a normal limiting amplifier. In addition, the gain levels/weighting coefficients of the feed forward equalizer according to the invention can be programmed.

FIG. 2 shows the timing of a signal profile. A trapezoidal signal is applied to the data transmission channel at the transmitter. The band limiting in the transmission path leads to the impulse response as shown in FIG. 2b. The trailing edge of the impulse response leads, with a high data density, to superimpositions of the individual impulse responses—the signal $U_{in}$ is distorted. The desired impulse response $U_{out}$ provided to the receiver is illustrated at FIG. 2c. In order to obtain this impulse response UOUt, it is necessary to subtract the appropriate time components from the actual impulse response.

The feed forward equalizer (FFE) according to the state of the art as shown in FIG. 1 does not eliminate sufficiently the distortions caused by the data transmission channel for data signals with a high data rate (DR) of more than one gigabit per second (1 Gbit/sec).

FIG. 3a shows the poles of the signal path formed by the low path filter (LPF) and the amplifier A1 in the complex plane.

Beside the pole of the low path filter the band limitation of the operation amplifier A1 forms a parasitic pole. The ratio between the parasitic pole and the desired pole formed by the low path filter (LPF) should always be higher than ten $$\left(\frac{W_p}{W_{par}} > 10\right).$$

Because of the band limitation of the operation amplifier A1 the parasitic pole approximates the pole of the low path filter (LPF) with an increasing data rate (DR). The basic problem of the feed forward equalizer (FFE) according to the state of the art is the band limitation of the analog elements.

FIG. 3b shows a bode diagram of the feed forward equalizer (FFE) according to the state of the art as shown in FIG. 1. As can be seen from FIG. 3b the parasitic pole caused by the operation amplifier A1 causes a steeper amplitude decrease in the higher frequency range. The phase shift of the FFE approximates $-180°$ with increasing data rate DR. Accordingly the group delay time is no longer constant and the impulse response of the feed forward equalizer (FFE) becomes unsymmetric with the increasing data rate DR. The unsymmetric pulse response of the feed forward equalizer (FFE) significates that the intersymbol interferences (ISI) caused by the data transmission channel can no longer be equalized by the equalizer.

FIG. 4 illustrates the amplitude characteristic of the conventional feed forward equalizer (FFE) as shown in FIG. 1. When the data rate frequency of the transmitted data signal reaches the fundamental frequency of the operation amplifier the FFE equalizer according to the state of the art does not behave like an ideal equalizer, i.e. it does not compensate the attenuation of the data transmission channel by a reverse amplitude characteristic. The real forward equalizer (FFE) according to the state of the art comprises a $-3$ dB alternation at the fundamental frequency. When the parasitic pole of the amplifier approaches the fundamental frequency distortions occur.

When using conventional continuos-time equalization methods the equalizer comprises a transfer function which is inverse to the transfer function $H_{channel}$ of the data transmission channel. Mathematically, this can be described in the Laplace plane as follows:

$$H_{equ}(s) = \frac{1}{H_{channel}(s)} = \frac{A \cdot \prod_{k=1}^{n}(1+s/\omega_{zk})}{\prod_{k=1}^{m}(1+s/\omega_{pk})} \qquad \text{(Equation 1)}$$

The following transfer function is obtained for the feed forward equalizer (FFE) shown in FIG. 1.

$$H_{equ}(s) = \frac{U_{out}}{U_{in}}(s) = A_2 - A_1 \frac{1}{(1+s/\omega_{lk})} \qquad \text{(Equation 2)}$$

$$H_{equ}(s) = \frac{U_{out}}{U_{in}}(s) = A_2 - A_1 \frac{1}{\prod_{k=1}^{m}(1+s/\omega_{lk})} \qquad \text{(Equation 3)}$$

Equation (3) illustrates the general representation of the implementation variant of the transfer function $H_{equ}$ for approximation of the channel transfer function $H_{channel}$. This implementation has the advantage that pole positions are required only for approximation—this is particularly advantageous for stability criteria.

In a discrete-time representation, the transfer function according to equation (3) can be represented as follows:

$$H_{equ}(z) = \frac{U_{out}}{U_{in}}(z) = A_2 - A_1 \frac{1}{1+\prod_{k=1}^{n}(b_{bk} \cdot z^{-k\tau})} = \qquad \text{(Equation 4)}$$

$$A_2 - A_1 \frac{1}{1+b_{b1} \cdot z^{-1\tau} + b_{b2} \cdot z^{-2\tau} + \ldots b_{bn} \cdot z^{-n\tau}}$$

Equation (4) provides the basic formal relationship to implement the feed forward equalizer according to the present invention.

As has been shown above a conventional feed forward equalizer do not provide sufficient equalization for very high data rates of more than one gigabit per second.

SUMMARY OF THE INVENTION

Accordingly it is the object of the present invention to provide a feed forward equalizer for equalization of a data signal received over a data transmission channel having a high data rate and a corresponding equalization method which are easy to implement and which provide a low technical complexity.

This object is achieved by a feed forward equalizer having the features of main claim 1 and a method for analog equalization of a received data signal having the features of main claim 19.

The invention provides a feed forward equalizer for analog equalization of a data signal received over a data transmission channel comprising:
(a) a Master Delay Locked Loop (M-DLL) for generating equidistant reference phase signals;
(b) a Slave Delay Line (S-DL) formed by serial connected Slave Delay Units (SDU),
wherein each Slave Delay Unit (SDU) has a Slave Delay Element (SDE) to delay the received data signal with a predetermined delay time ($\Delta T$) and an analog amplifier which amplifies the delayed output signal of the Slave Delay Element (SDE) with a respective weighting coefficient to generate a weighted delay signal,
wherein the analog amplifier is switched transparent in response to a corresponding reference phase signal generated by said Master Delay Locked Loop (M-DLL); and
(c) subtracting means for subtracting the weighted delay signals which are selected by means of a multiplexer from the received data signal to generate an equalized output data signal.

In a preferred embodiment the multiplexer is controlled by a control word stored in a control register.

In a further embodiment of the feed forward equalizer according to the present invention the weighting coefficients are stored in a coefficient register.

In a further preferred embodiment the weighting coefficients are programmable by a control unit.

In a further preferred embodiment the feed forward equalizer according to the present invention the slave delay line (SDL) comprises a predetermined number of slave delay units (SDL) which are connected in series.

In a preferred embodiment the master delay locked loop (DLL) comprises a predetermined number of master delay (MDU) units which are connected in series.

In a preferred embodiment of the feed forward equalizer according to the present invention each master delay unit (MDU) includes a master delay element and an amplifier.

The master delay locked loop (M-DLL) is clocked in a preferred embodiment by a reference clock signal (CLK).

In a preferred embodiment the clock period of the reference clock signal (CLK) is a fraction of the unit interval (UI) of the data signal.

In a preferred embodiment of the feed forward equalizer (FFE) according to the present invention the slave delay elements (SDE) are formed identical to the master delay elements (MDE).

In a preferred embodiment of the feed forward equalizer according to the present invention all weighted delay signals are supplied to input terminals of the multiplexer (MUX) which switches the weighted delay signals through a central summation point depending from the control word stored in said control register.

In a preferred embodiment the weighted delay signals which are switched through by said multiplexer (MUX) are substracted at the central summation point from the received data signal.

In an alternative embodiment of the feed forward equalizer (FFE) according to the present invention each slave delay unit (SDU) of the slave delay line (SDL) further includes a decentral summation point to substract the weighted delay signal from the received data signal.

In a preferred embodiment the decentral summation points of the slave delay units (MDU) are connected to respective input terminals of the multiplexer (MUX) which switches the decentral summation points through to an output of the multiplexer depending on the control word stored in said control register.

In a preferred embodiment of the feed forward equalizer (FFE) according to the present invention the equalized output data signal is amplified by a post amplifier.

The equalized output data signal is preferably supplied to a decision unit of a receiver.

In a preferred embodiment of the feed forward equalizer (FFE) according to the present invention a buffer is provided for buffering the received data signal.

In a preferred embodiment of the feed forward equalizer (FFE) according to the present invention the data rate (DR) of the received data signal is more than one gigabit per second (DR$\geq$1 Gbit/sec.

The invention further provides a method for analog equalization for a received data signal having the features of main claim 19.

The invention provides a method for analog equalization of a received data signal comprising the following steps:
(a) generating equidistant reference phase signals by means of a delay locked loop (DLL),
(b) delaying the received data single by means of serial connected delay elements,
(c) amplifying the delayed output signals of the delay elements with respective weighting coefficients by means of analog amplifiers to generate weighted delay signals, wherein the analog amplifiers are switched transparent in response to the reference phase signals generated by said delay locked loop (DLL),
(d) selecting weighting delay signals by means of a multiplexer depending on a stored control word, and
(e) substracting the selected weighted delay signals from the received data signal to generate an equalized output data signal.

The invention provides a combination of discrete-time circuit technology for high-speed serial data transmission channel. The formal relationship, as shown in equations (3) or (4), for approximation of the channel can be implemented according to the invention both on a continuous-time basis and on a discrete-time basis.

In the following preferred embodiments of the feed forward equalizer (FFE) and of the method for analog equalization of a received data signal are described with reference to the enclosed figures.

DETAILED DESCRIPTION OF THE INVENTION

In the following preferred embodiments of the feed forward equalizer (FFE) according to the present invention are described with respect to the enclosed figures.

Figure 1:
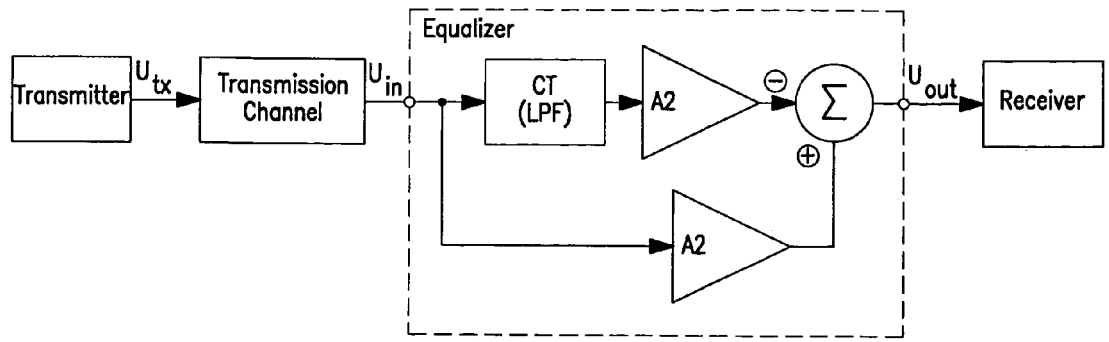
FIG. 1 shows a conventional feed forward equalizer (FFE) according to the state of the art.
Figure 2A:
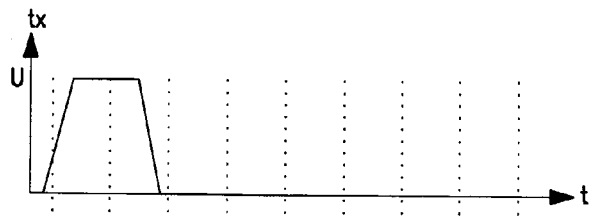
FIG. 2 shows a timing diagram for a feed forward equalizer (FFE) according to the state of the art at a low data rate.
Figure 2B:
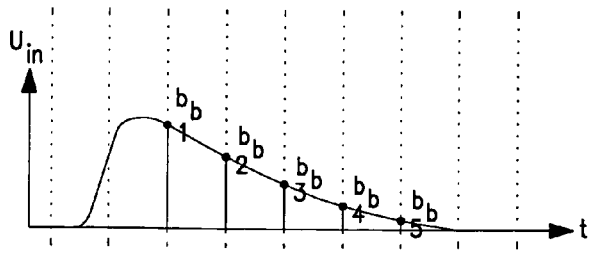
Figure 2C:
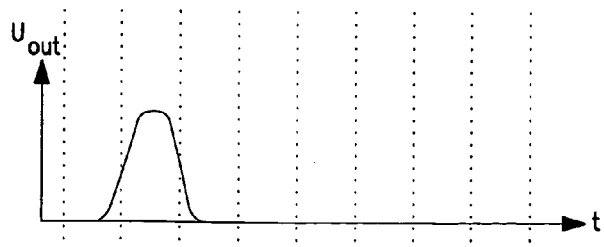
Figure 3A:
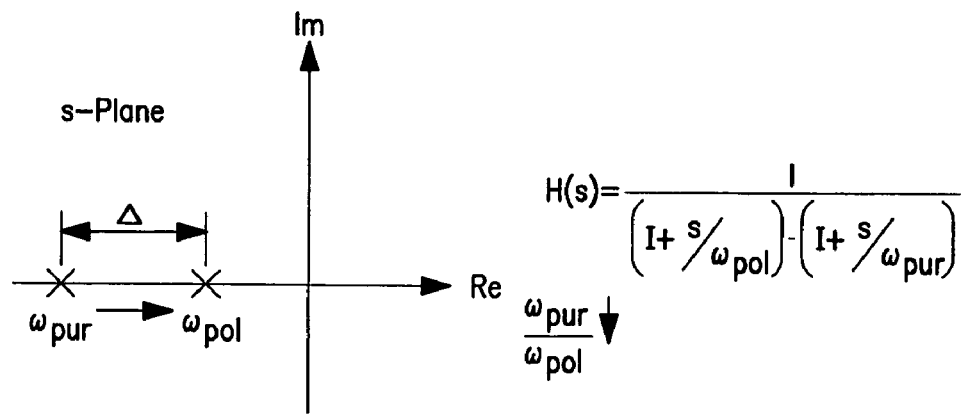
FIG. 3a) shows a pole diagram of a conventional feed forward equalizer (FFE) according to the state of the art as shown in FIG. 1.
Figure 3B:
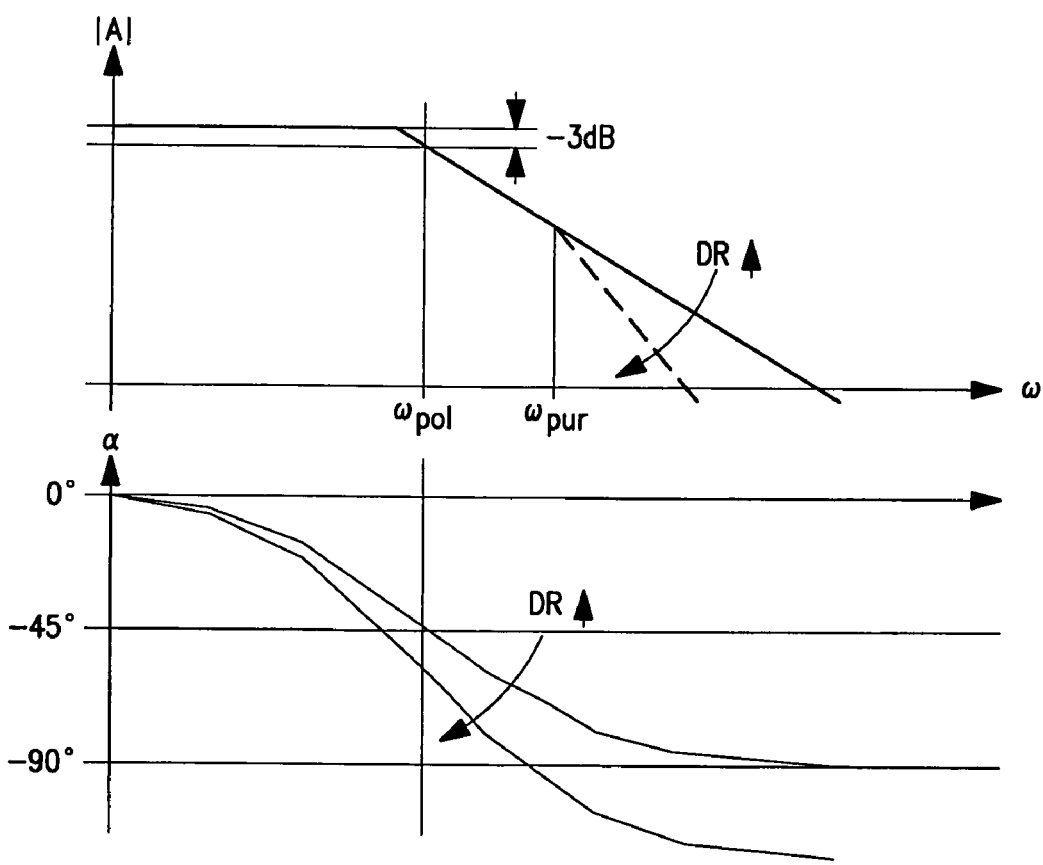
FIG. 3b shows a bode diagram of a conventional feed forward equalizer (FFE) according to the state of the art as shown in FIG. 1.
Figure 4:
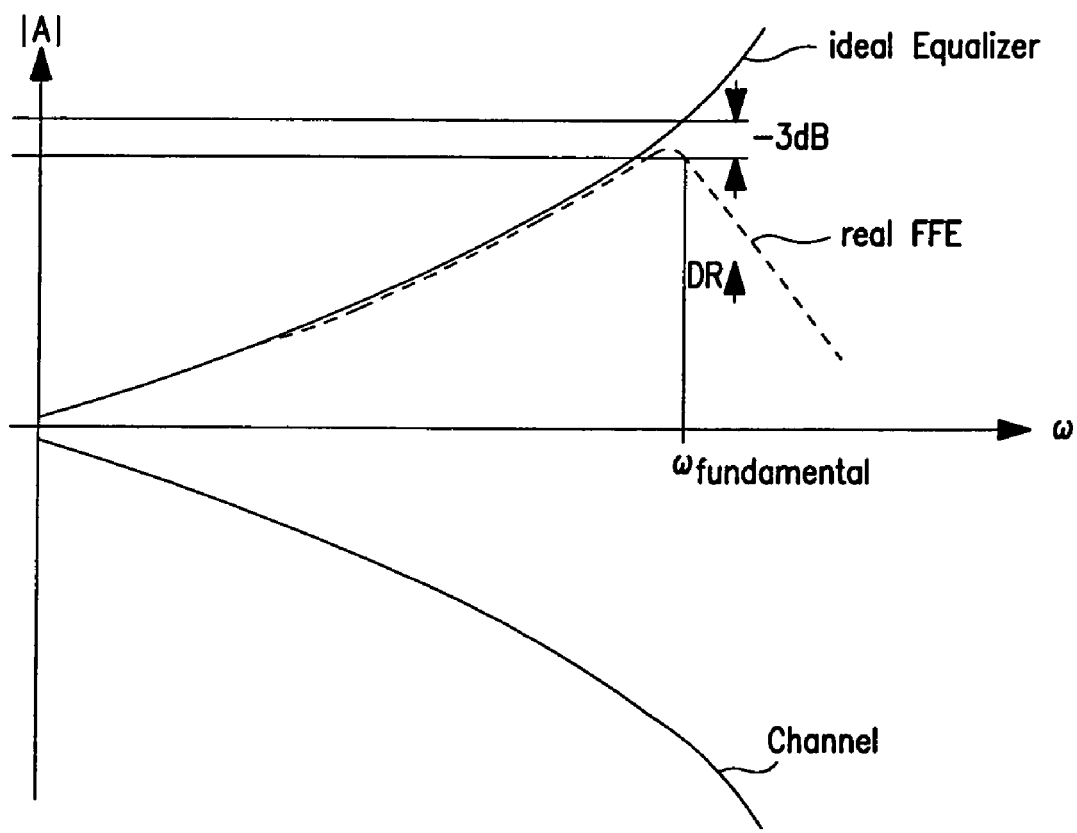
FIG. 4 shows a amplitude characteristic of a conventional feed forward equalizer (FFE) according to the state of the art to illustrate the problem to be solved by the feed forward equalizer according to the present invention.
Figure 5:
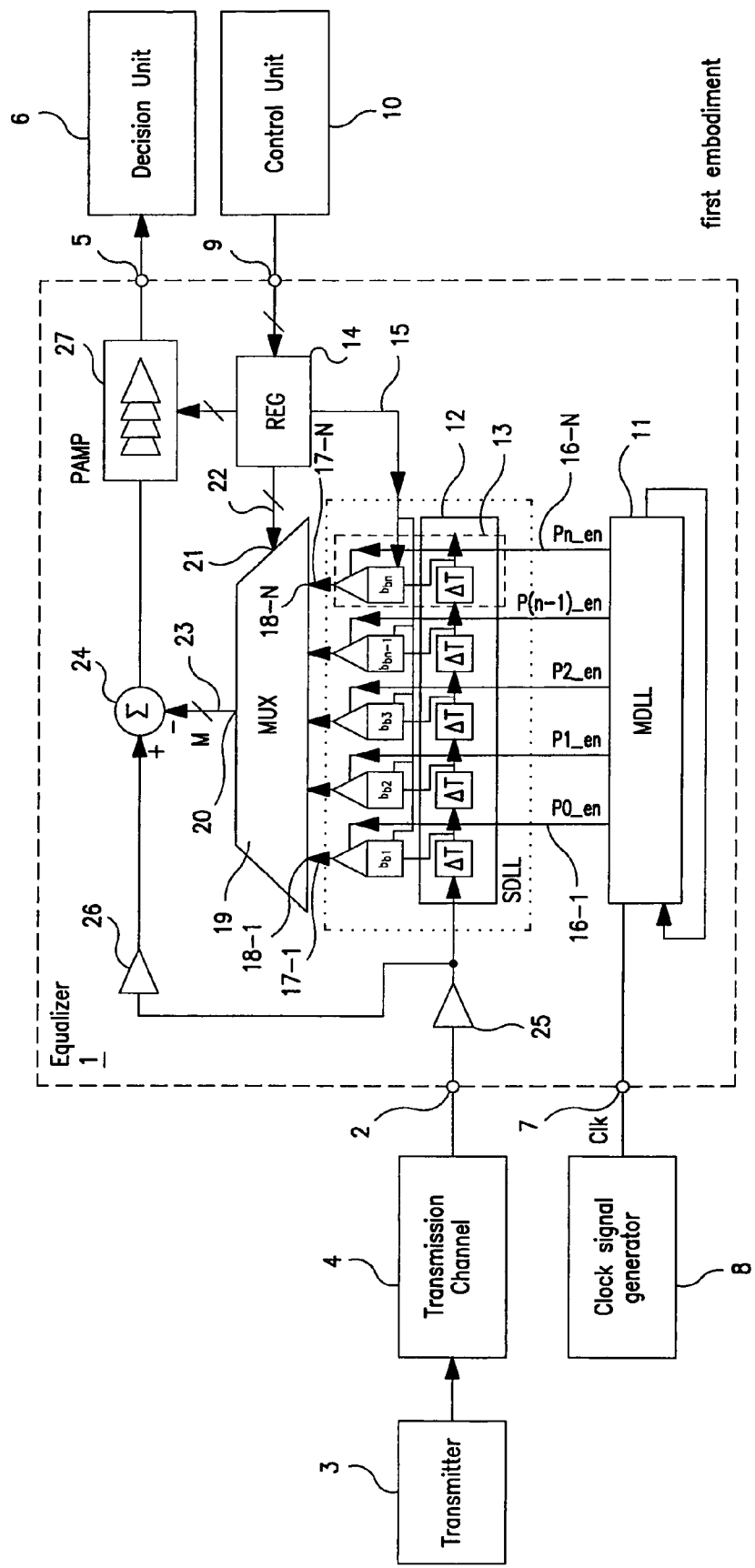
FIG. 5 shows a first embodiment of the feed forward equalizer according to the present invention.

As can be seen from FIG. 5 which shows a first embodiment of the feed forward equalizer 1 according to the present invention the equalizer 1 receives at a data input 2 a high frequency serial data signal transmitted by a transmitter 3 via a data transmission channel 4. The feed forward equalizer 1 according to the present invention is provided to eliminate intersymbol interferences (ISI) caused by the data transmission channel 4. The feed forward equalizer 1 according to the present invention comprises a data output 5 which supplies an equalized output data signal or a decision unit 6 of a receiver. The feed forward equalizer 1 according to the present invention further comprises a clock input terminal 7 for reception of a reference clock signal (CLK). The reference clock signal (CLK) is either generated by a clock signal generator 8 or is formed by a system clock signal. The feed forward equalizer 1 according to the present invention further comprises a control input terminal 9 for reception of a control word from a control unit 10 of the receiver.

The feed forward equalizer 1 according to the present invention is provided for analog equalization of the data signal received over the data transmission channel 4. The feed forward equalizer 1 comprises a master delay locked loop 11 for generating equidistant reference phase signals which are supplied to a slave delay line 12. The slave delay line 12 is formed by a serial connected slave delay units 13-$i$. Each slave delay unit 13-$i$ comprises a slave delay element 13$a$-$i$ to delay the received data signal with a predetermined time delay and an analog amplifier 13$b$-$i$ which amplifies the delayed output signal of the slave delay element 13$a$-$i$ with a respective weighting coefficient $b_i$ to generate a weighted delay signal. The weighting coefficients $b_i$ are stored in a preferred embodiment in a coefficient register 13$c$-$i$ of the slave delay unit 13. The weighting coefficients $b_i$ are in a preferred embodiment programmable by the control unit 10. The control unit 10 writes the desired weighting coefficients $b_i$ into a register 14 of the feed forward equalizer 1 from where they are copied via internal lines 15 to the coefficient registers 13$c$-$i$ of the slave delay units 13-$i$. The analog amplifiers 13$b$-$i$ of the slave delay units 13-$i$ are switched transparent in response to a corresponding reference phase signal $C_\theta$ generated by the master delay locked loop 11. The master delay locked loop 11 supplies the generated reference phase signals $C_\theta$ via control lines 16-$i$ to the respective analog amplifiers 13$b$-$i$ within the slave delay units 13-$i$ of the slave delay line 12.

In the first embodiment as shown in FIG. 5 the output of each analog amplifier 13$b$-$i$ of the slave delay line 12 is connected via a corresponding signal line 17-$i$ to an input terminal 18-$i$ of a N:M Multiplexer 19 having N input terminals 18-$i$ and M output terminals 20. The multiplexer 19 comprises control input terminals 21 which are connected via control lines 22 to the programmable register 14.

The number M of output terminals of the N:M multiplexer 19 is smaller or equal to the number N of input terminals N of the multiplexer 19. The output terminals 20 of the multiplexer are connected via M output lines 23 to substracting means 24 which are provided for substracting the weighted delay signals which are selected by means of the multiplexer 19 from the received data signal to generate an equalized output data signal.

The feed forward equalizer 1 according to the present invention as shown in FIG. 5 comprises a first buffer 25 and a second buffer 26 for buffering the received input data signal. The received data signal buffered by the second buffer 26 is supplied to the substracting means 24 which is formed as a central summation point. The signal output by the multiplexer 19 is substracted from the received data signal to generate equalized output signals.

The feed forward equalizer 1 according to the first embodiment as shown in FIG. 5 further comprises a post amplifier stage 27 for amplification of the equalized output data signal before it is supplied to the decision unit via output data terminals 5 of the feed forward equalizer 1. The buffers 25, 26 and the post amplifying stage 24 are formed preferably by differential amplifiers.

Figure 6A:
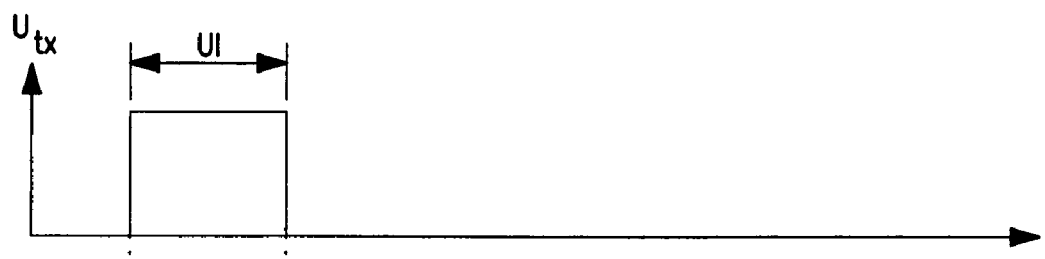
FIG. 6 shows timing diagrams to illustrate the functionality of the feed forward equalizer according to the present invention.
Figure 6B:
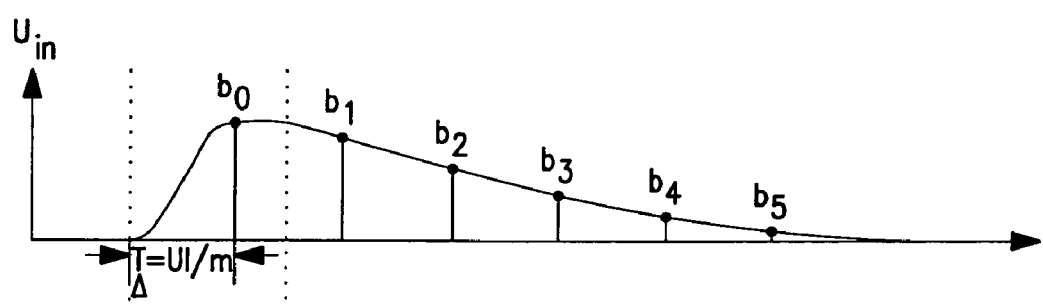

FIG. 6 illustrates the functionality of the feed forward equalizer 1 according to the present invention as shown in FIG. 5.

FIG. 6$a$ shows a data impulse representing a data bit transmitted by the transmitting device 3 via the data transmission channel 4 through the data input 2 of the feed forward equalizer 1. The logical high data bit is represented via a signal impulse having predetermined time length called the unit interval UI.

FIG. 6$b$ shows the received data pulse ($U_{in}$) at the data input terminal 2 of the feed forward equalizer 1 which have been distorted by the data transmission channel 4.

The master delay locked loop 11 generates equidistant reference phase signals which are spaced from each other with a time difference $\Delta T$ which is fraction of the unit interval UI:

$$\Delta T = UI/m \quad m=1, 2, 3 \ldots .$$

The reference phase signals CU generated by the master delay locked loop 11 switch the analog amplifiers 13$c$-$i$ within the slave delay line 12 sequentially with the time delay $\Delta T$ transparent so that the received data signal delayed by the delay elements 13$a$-$i$ within the delay line 12 is amplified with the weighting coefficients $b_i$ and the weighted signals are substracted from the original data signal when they are switched switch through by the N:M multiplexer 19 according to the control word stored in the register 14.

The equalized output data signal at the output terminal 5 is shown in FIG. 6$b$. In the given example as shown in FIG. 6 the weighting coefficients b2, b3, b4, b5 are programmed as shown in FIG. 6$b$ and the multiplexer 19 is programmed in such a manner that corresponding weighting output signals are switched to the substracting means 24. In the given example the weighted output signals weighted with the coefficients b0, b1 are blocked by the multiplexer 19 since in this signal region the received input signal $UI_{in}$, is comparatively high i.e. over a chosen threshold value $U_{th}$.

The control register 19 stores the values of the weighting coefficients $b_i$ and the input terminals 18-$i$ to be blocked by the multiplexer 20. The control register 19 is programmable by the control unit 10 according to the known impulse response of the data transmission channel 4.

Figure 6C:
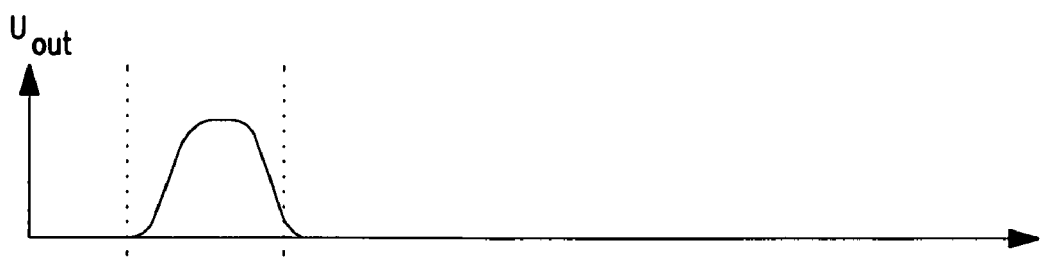

FIG. 6c shows the equalized signal output by the substracting means 24 after the weighted output signals b2, b3, b4, b5 have been substracted from the original received data input signal.

Figure 7:
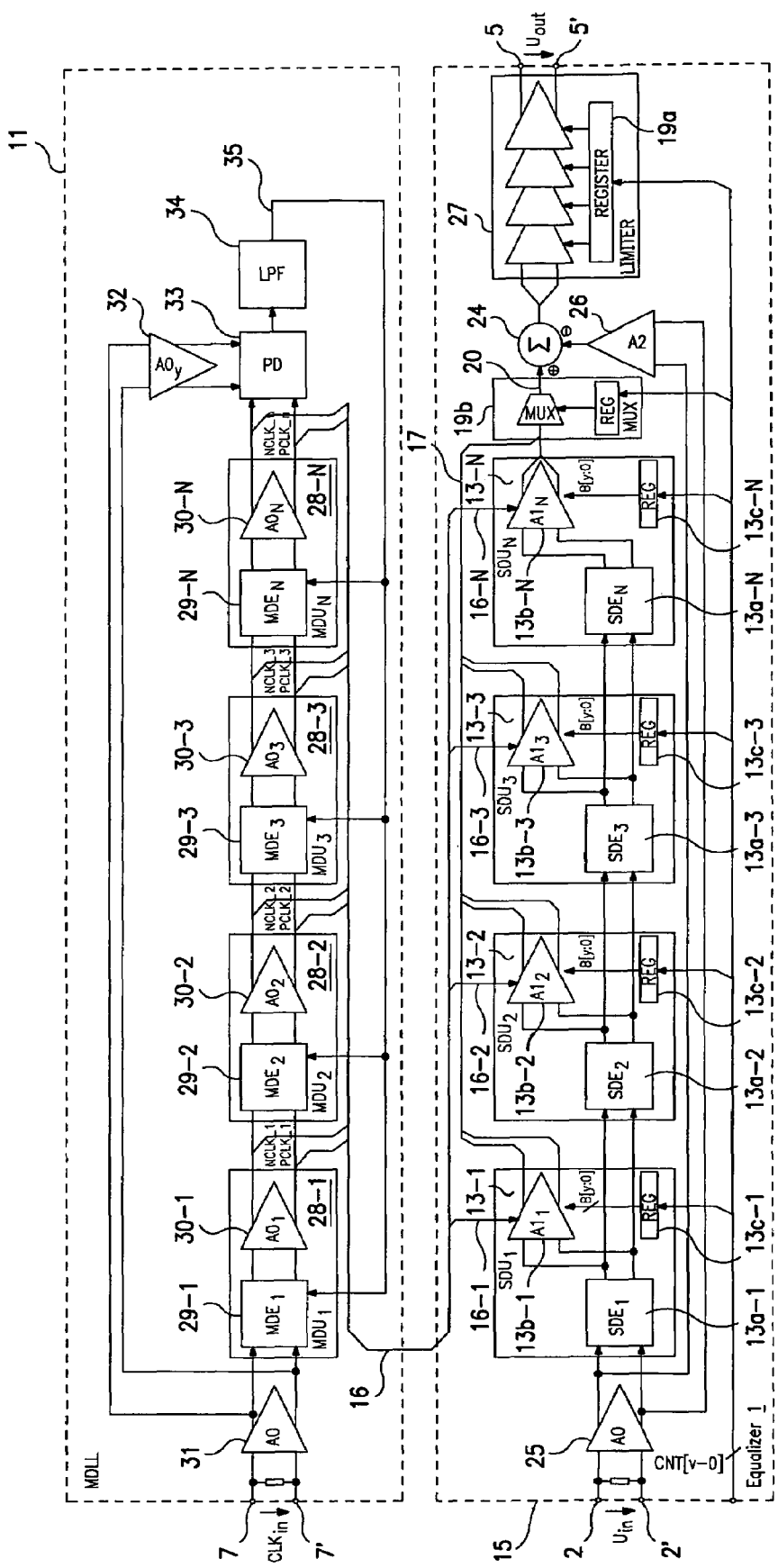
FIG. 7 shows an implementation of the first embodiment of the first feed forward equalizer according to the present invention as shown in FIG. 5.

FIG. 7 shows the implementation of the first embodiment of the feed forward equalizer 1 according to the present invention as shown in FIG. 5.

As can be seen from FIG. 7 the feed forward equalizer 1 is formed in this preferred embodiment fully differential.

As can be seen from FIG. 7 the slave delay line 12 is formed by slave delay units 13-$i$ which are connected in series to each other. Each slave delay unit 13-$i$ comprises a slave delay element 13$a$-$i$, an analog amplifier 13$b$-$i$ and an integrated control register 13$c$-$i$ for storing the programmable weighting coefficients $b_i$ for the respective analog amplifier 13$b$-$i$. The analog amplifiers 13$b$-$i$ are switched transparent in response to a corresponding reference phase signal CU supplied to the amplifier 13$b$-$i$ via a control line 16-$i$ from the master delay locked loop 11. The differential outputs of the analog amplifiers 13$b$-$i$ are supplied via signal lines 17 to the output terminal 18 of the N:M multiplexer 19 as shown in FIG. 7.

FIG. 7 shows the master delay locked loop 11 for generating the equidistant reference phase signals CU supplied via lines 16 to the slave delay line 12 in more detail. The master delay locked loop 11 comprises a predetermined number N of master delay units 28-$i$ which are connected in series to each other. Each master delay unit 18-$i$ includes a master delay element 29-$i$ and an signal amplifier 30-$i$. The master delay locked loop 11 is clocked by a reference clock signal CLK supplied to the differential clock signal input 7 of the master delay locked loop 11. The clock signal CLK is amplified by a first differential amplifier 31 and supplied to a chain of the master delay unit 29-$i$. The amplified clock signal is further supplied to a second differential amplifier 32 which outputs the clock signal to a phase detector 33.

The phase detector 33 compares the phase between the output signal of the last master delay unit 30-$n$ and the clock signal amplified by means of the second amplifier 32. The output signal of the phase detector which is proportional to the phase difference is supplied to a low path loop filter 34 which filters the phase difference and supplies a feedback signal via a feedback line 35 to control input of the master delay elements 29-$i$.

The master delay unit 11 regulates the two input signals at the input of the phase detector 33 in a first version to a phase difference of 180° and in a second version to a phase difference of 360°.

The phase reference signals generated by the master delay locked loop 11 N/P-CLK-1 to N/P-CLK-N comprise an equidistant phase difference. A phase reference signal generated by a master delay unit 28-$i$ within a master delay line 11 is supplied via a control line 16 to a corresponding slave delay unit 13-$i$ of the slave delay line 12 to switch the included amplifier 13$b$-$i$ transparent to the corresponding input terminal 18-$i$ of the multiplexer 19.

In a preferred embodiment the slave delay element 13$a$-$i$ in a slave delay unit 13-$i$ is identical in design to the master delay element 29-$i$ within the master delay unit 28-$i$.

The gain of the amplifiers 13$b$-$i$ within the slave delay unit 13-$i$ is programmable according to the weighting coefficients stored in the corresponding register 13$c$-$i$ of the slave delay unit 13-$i$. The delay elements 13-$i$ form the time delay $Z^{-\tau}$ in equation (4). The amplifiers 13$c$-$i$ form the coefficients $b_i$. The overall delay is obtained from the sum of the individual delays.

The delay within the slave delay element 13-$i$ is implemented in such a way that the slave delay element 13-$i$ disconnects the input signal with the rising edge of CLK1 . . . n of the differential clock signal P/N-CLK1 . . . n toward the amplifier 13$b$-$i$. The signal from the slave delay element 13-$i$ is passed to the next slave delay element 13-$i$+1 while the signals from the amplifiers 13$b$-1 to 13$b$-$n$ are passed to the multiplexer 19.

Depending to the desired equalization depth the number N of delay elements can be varied, or can be matched by suitable coefficients (gain).

At the summation point 24 the weighted signals and the undelayed received data signal are substracted from each other. The difference signals which represents the equalized output signal is additionally amplified or limited by the amplifying stage 27.

An advantage of the implementation according to the present invention as shown in FIG. 7 is the capability to implement the equalizer 1 with a simple analog circuitry (for example current mode). A quasi digital operation is provided with a wide bandwidth at the same time with a differential signal routing. According to the present invention the advantages of a simple digital signal processing are combined with the advantages of a broadband, interference-resistant, analog implementation for signal equalization.

Figure 8:
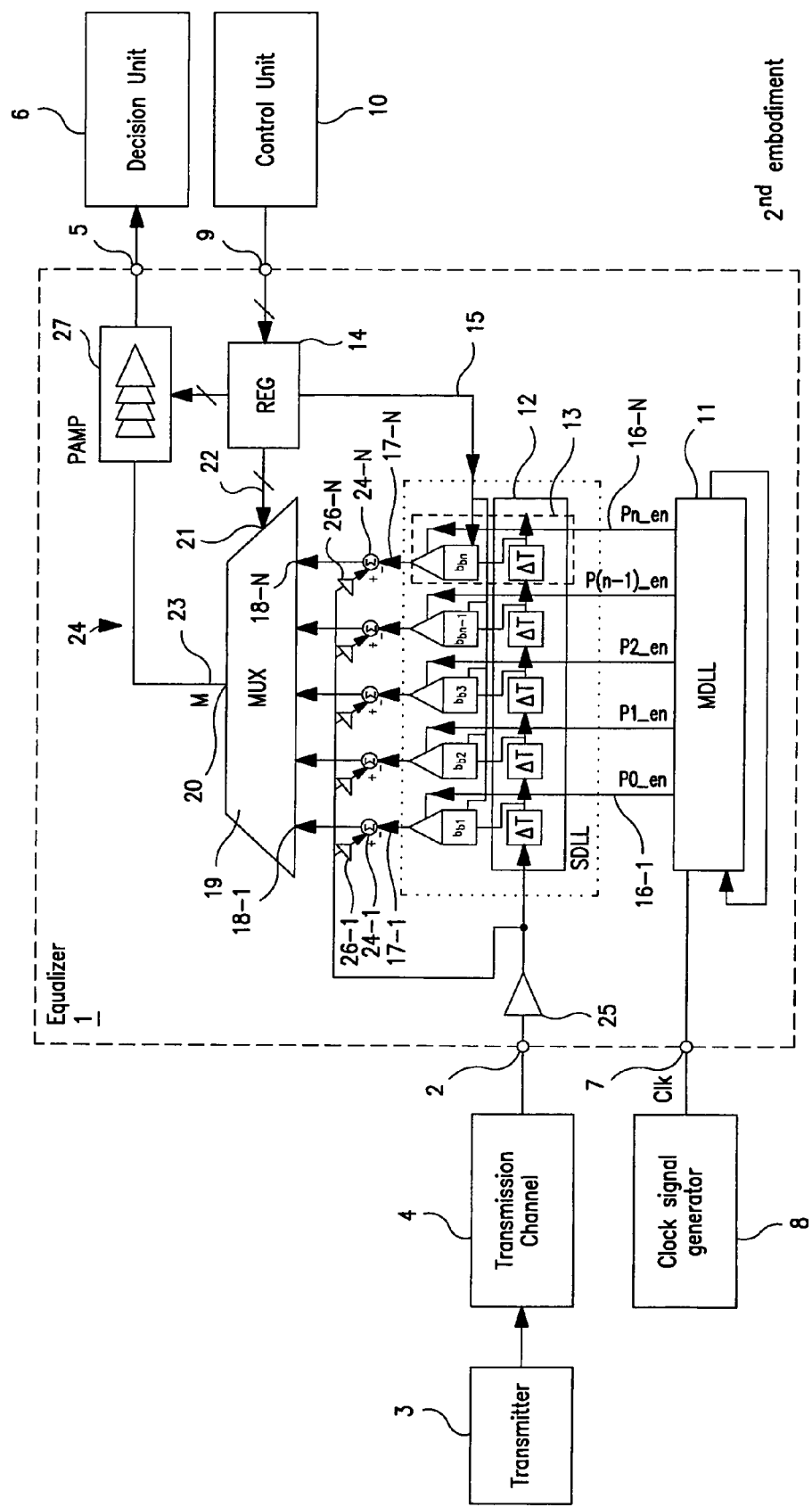
FIG. 8 shows a second embodiment of the feed forward equalizer according to the present invention.

In the second embodiment the feed forward equalizer 1 as shown in FIG. 8 substracting of the weighted delay signals is performed within slave delay units 13-$i$ of the slave delay line 12. The central summation point 24 according to the first embodiment of the feed forward equalizer 1 as shown in FIG. 5 is substituted by decentralized summation point 24-$i$. In each slave delay unit 13-$i$ of the slave delay line an input buffer 26-$i$ and a decentral summation point 24-$i$ is integrated.

Figure 9:
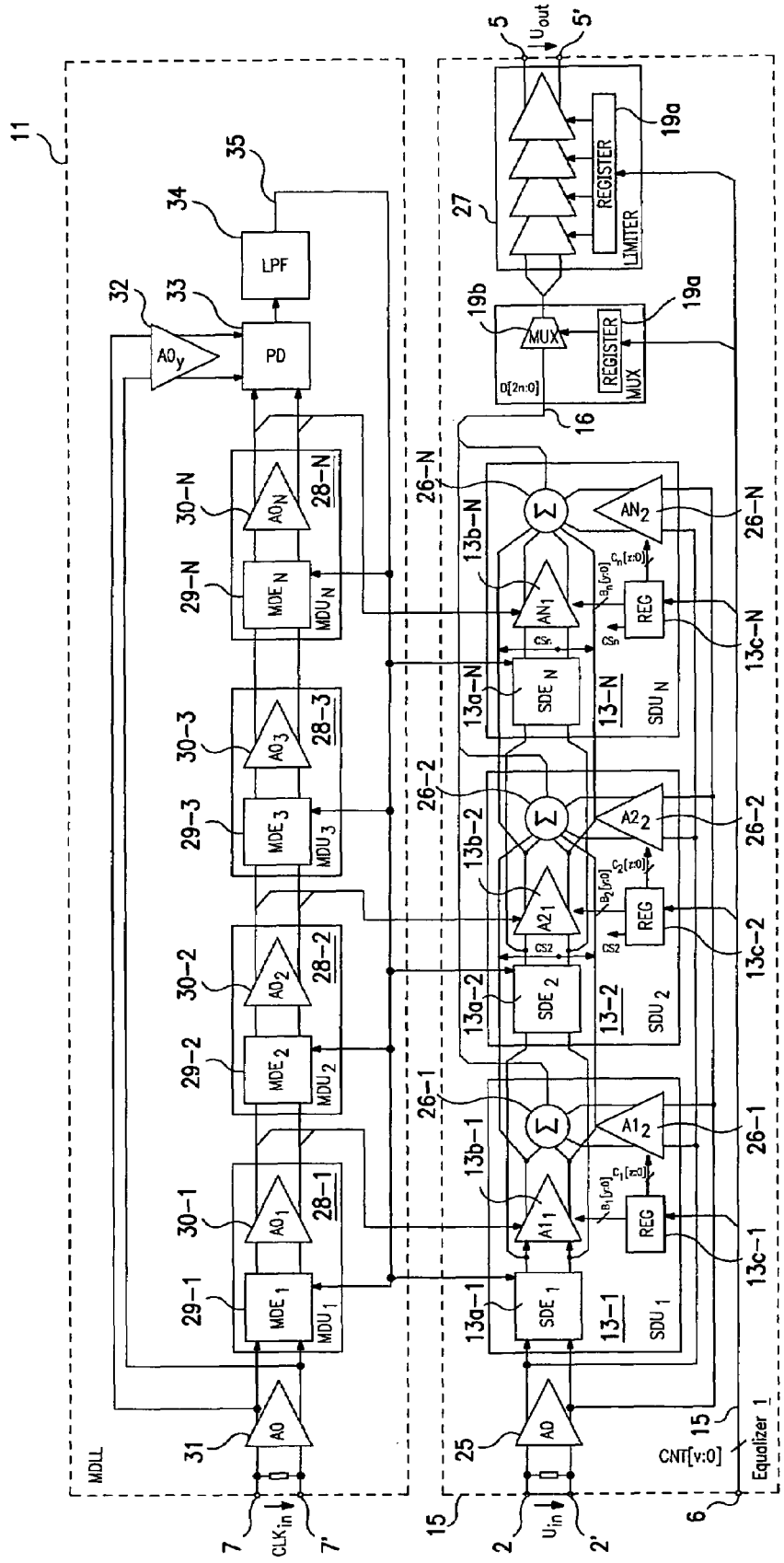
FIG. 9 shows an implementation of the second embodiment of the feed forward equalizer according to the present invention as shown in FIG. 8.

FIG. 9 shows the feed forward equalizer 1 according to the second embodiment as shown in FIG. 8 in more detail.

In the second embodiment as shown in FIG. 9 each slave delay unit 13-$i$ comprises a slave delay element 13$a$-$i$, an analog amplifier 13$b$-$i$ and a coefficient register 13$c$-$i$ as in the first embodiment shown in FIG. 7. However, in the second embodiment of FIG. 9 each slave delay unit 13-$i$ further comprises a decentralized summation point 24-$i$ and a signal buffer 26-$i$. The decentral summation points 24-$i$ of the slave delay units 13-$i$ are connected to respective input terminals 18 of the multiplexer 19 which switches the decentral summation points through to an output of the multiplexer depending on a control word stored in the control register 14. The equalized output signal is amplified by the output amplifying stage 27 and supplied to a decision unit of a receiver via an output terminal 5 of the feed forward equalizer 1. The advantage of the second embodiment of the feed forward equalizer 1 as shown in FIG. 9 is that it can be implemented in a particularly advantageous manner using analog circuitry.

Depending on the programming the feed forward equalizer 1 can operate with 1, 2 or any N desired stages. For this purpose the delayed and weighted signal from the previous stage i is passed to the summation point of the next stage i+1. The control provided from the subsequent stage by a signal CS (i+1). The summation of the previous stage is no longer taken into account. The equalized signal from the stage (i+1) is selected via a multiplexer.

Figure 10:
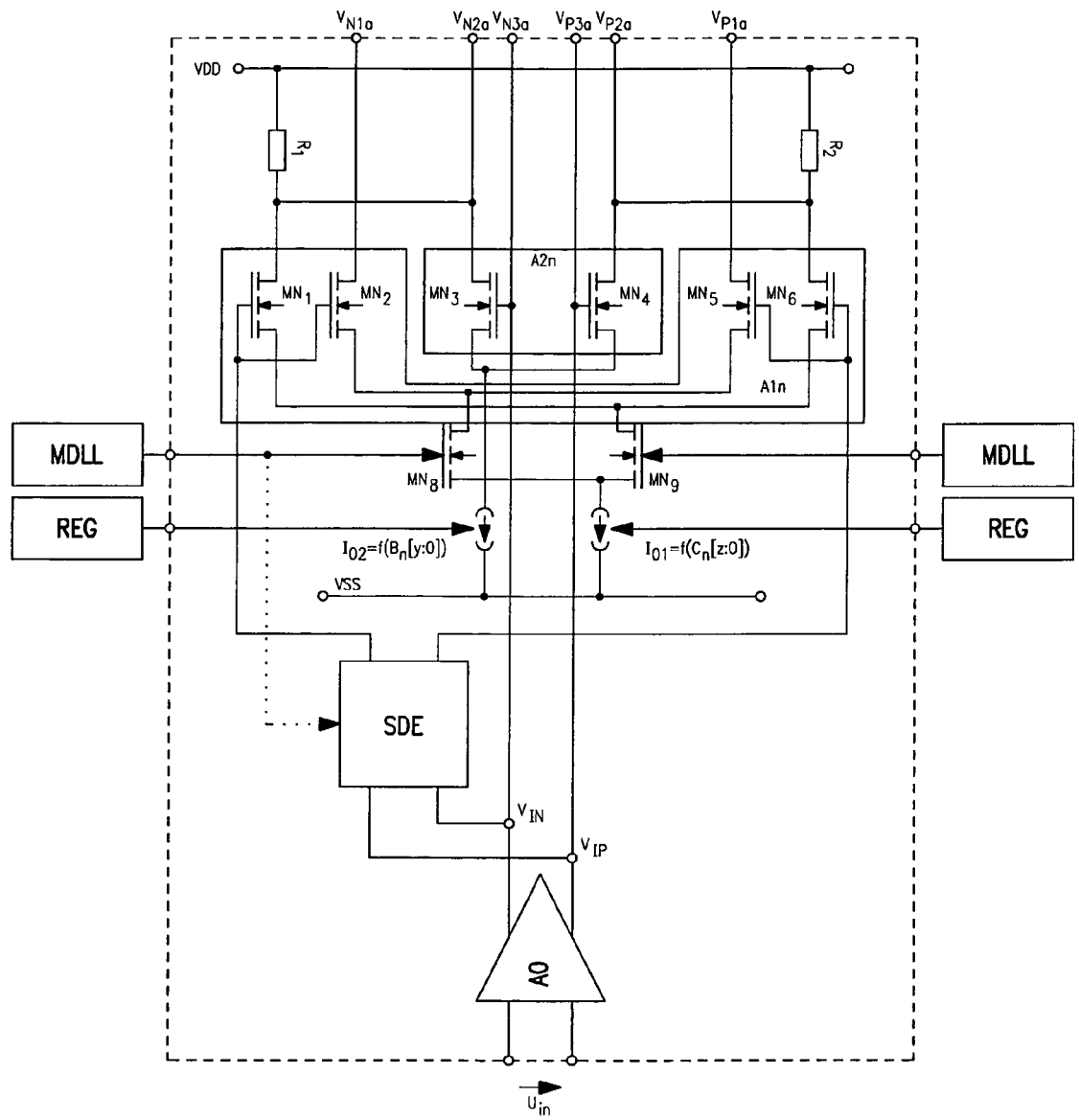
FIG. 10 shows a circuit diagram of a delay element as employed in the feed forward equalizer according to the present invention.

FIG. 10 shows a transistor circuit in which a slave delay element 13-*i* as shown in FIG. 9 of the second embodiment is illustrated. The transistor pairs M1 and M6, MN2 and MN5 as well as MN3 and NM4 form a differential amplifier. The summation point 24-*i* is formed as the current sum in the resistor RL. The difference pair MN3 and MN4 form the amplifier 26-*i*. The transistors MN1, MN6, MN2 and MN5 form the amplifier 13*b-i*. The transistors MN8 and MN9 switch the current source 102, which can be set as a function of Bn[y:0]. If the signal is intended to be passed to the next stage i+1, then the signal supplied via line 16-1 becomes positive and NCS supplied via line 16-1 becomes negative. The complete current $I_{02}$ is now passed to the difference pairs MN2/MN5. The gradient of the transistors MN1, MN2, MN5 and MN6 is ideally the same.

The transistors MN3 and MN4 are driven from the amplifier 25 as shown in FIG. 10. The delay elements 13*a-i* may be in any desired form. However, it is once again advantageous in this case for both delay elements to be an arrangement based on difference amplifier stages.

Figure 11:
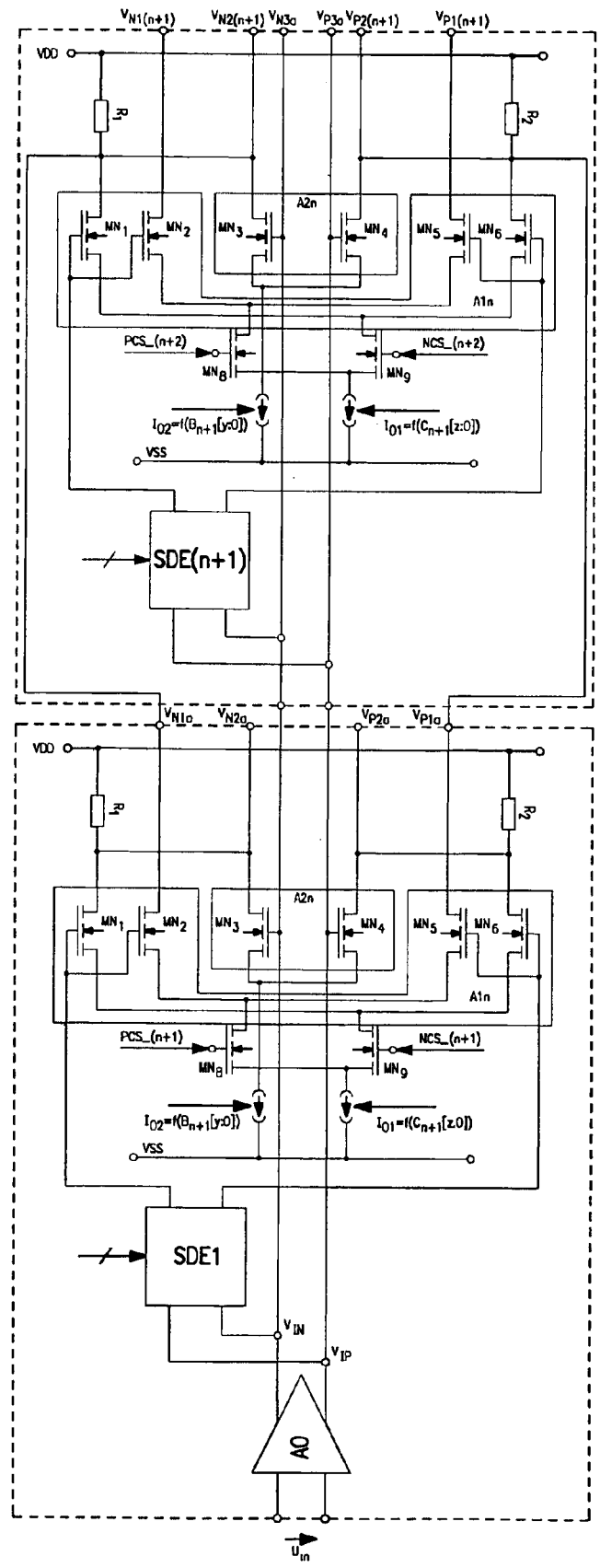
FIG. 11 shows a circuit diagram of two cascaded delay elements according to the present invention as shown in FIG. 10.

FIG. 11 shows a cascaded arrangement. The outputs $D_j$, $\overline{D}_j$ are in this case connected to the summation point of the next stage i+1. The signals M,$\overline{M}$ are passed to the multiplexer 19, as shown in FIG. 8. The signals VN and VP are connected only to the next difference pair (MN3 & MN4) in this stage.

The advantage of the cascaded arrangement as shown in FIG. 11 is the completely symmetrical structure, which allows differential signal processing. The layout can be optimally matched to the signal flow, and signal line crossings can be avoided to the maximum extent. This is particularly advantageous for radio-frequency applications.

The feed forward equalizer 1 according to the present invention provides an analog signal equalization. The feed forward equalizer 1 according to the present invention uses digital concepts for equalization realized with analog components. A master delay locked loop 11 generates equidistant reference signals. Advanced delay units with inherent weighting filter coefficients are based on a digital concept for equalization. The feed forward equalizer 1 according to the present invention is especially suited for high frequency data signals having a data transmission rate of more than one Gbit/sec. The used analog circuitry is easy to implement and to integrate on a chip.

What is claimed is:

1. A feed forward equalizer for analog equalization of a data signal received over a data transmission channel comprising:
   (a) a Master Delay Locked Loop for generating equidistant reference phase signals;
   (b) a Slave Delay Line formed by serial connected Slave Delay Units, wherein each Slave Delay Unit has a Slave Delay Element to delay the received data signal with a predetermined delay time and an analog amplifier which amplifies the delayed output signal of the Slave Delay Element with a respective weighting coefficient to generate a weighted delay signal, wherein the analog amplifier is switched transparent in response to a corresponding reference phase signal generated by said Master Delay Locked Loop; and
   (c) subtracting means for subtracting the weighted delay signals which are selected by means of a multiplexer from the received data signal to generate an equalized output data signal.

2. The feed forward equalizer according to claim 1, wherein the multiplexer is controlled by a control word stored in a control register.

3. The feed forward equalizer according to claim 1, wherein the weighting coefficients are stored in a coefficient register.

4. The feed forward equalizer according to claim 3, wherein the weighting coefficients are programmable by a control unit.

5. The feed forward equalizer according to claim 1, wherein the Slave Delay Line comprises a predetermined number of Slave Delay Units which are connected in series.

6. The feed forward equalizer according to claim 1, wherein the Master Delay Locked Loop comprises a predetermined number of Master Delay Units which are connected in series.

7. The feed forward equalizer according to claim 6, wherein each Master Delay Unit includes a Master Delay Element and an amplifier.

8. The feed forward equalizer according to claim 6, wherein the Master Delay Locked Loop is clocked by a reference clock signal.

9. The feed forward equalizer according to claim 8, wherein the clock period of the reference clock signal is a fraction of the unit interval of the data signal.

10. The feed forward equalizer according to claim 1, wherein the Slave Delay Elements are formed identical to the Master Delay Elements.

11. The feed forward equalizer according to claim 1, wherein all weighted delay signals are supplied to input terminals of the multiplexer which switches the weighted delay signals through to a central summation point depending from a control word stored in said control register.

12. The feed forward equalizer according to claim 11, wherein the weighted delay signals which are switched through by said multiplexer are subtracted at the central summation point from the received data signal.

13. The feed forward equalizer according to claim 1, wherein each Slave Delay Unit of the Slave Delay Line further includes a decentral summation point to subtract the weighted delay signal form the received data signal.

14. The feed forward equalizer according to claim 13, wherein the decentral summation points of the Slave Delay Units are connected to respective input terminals of the multiplexer which switches the decentral summation points through to an output of the multiplexer depending on the control word stored in said control register.

15. The feed forward equalizer according to claim 1, wherein the equalized output data signal is amplified by a post amplifier.

16. The feed forward equalizer according to claim 1, wherein the equalized output data signal is supplied to a decision unit.

17. The feed forward equalizer according to claim 1, wherein a buffer is provided for buffering the received data signal.

18. The feed forward equalizer according to claim 1, wherein the data rate of the received data signal is more than $$1 \frac{Gbit}{\sec}.$$

19. Method for analog equalization of a received data signal comprising the following steps:
   (a) generating equidistant reference phase signals by means of a Delay Locked Loop;

(b) delaying the received data signal by means of serial connected delay elements;

(c) amplifying the delayed output signals of the delay elements which respective weighting coefficients by means of analog amplifiers to generate weighted delay signals, wherein the analog amplifiers are switched transparent in response to the reference phase signals generated by said Delay Locked Loop;

(d) selecting weighted delay signals by means of a multiplexer depending on a stored control word; and (e) subtracting the selected weighted delay signals from the received data signal to generate an equalized output data signal.

* * * * *